United States Patent
King et al.

(10) Patent No.: US 11,171,870 B2
(45) Date of Patent: Nov. 9, 2021

(54) COMMUNICATION FAILOVER AND LOAD BALANCING METHOD

(71) Applicant: West Corporation, Omaha, NE (US)

(72) Inventors: William King, Seattle, WA (US); Bayan W. Towfiq, Seattle, WA (US)

(73) Assignee: Intrado Corporation, Omaha, NE (US)

( * ) Notice: Subject to any disclaimer, the term of this patent is extended or adjusted under 35 U.S.C. 154(b) by 0 days.

(21) Appl. No.: 16/128,199

(22) Filed: Sep. 11, 2018

(65) Prior Publication Data

US 2019/0081898 A1 Mar. 14, 2019

Related U.S. Application Data

(60) Provisional application No. 62/557,555, filed on Sep. 12, 2017.

(51) Int. Cl.
| | |
|---|---|
| *H04L 12/803* | (2013.01) |
| *H04L 12/707* | (2013.01) |
| *H04L 12/703* | (2013.01) |
| *H04W 36/22* | (2009.01) |
| *H04L 12/66* | (2006.01) |
| *H04M 3/42* | (2006.01) |
| *H04M 3/36* | (2006.01) |
| *H04W 36/00* | (2009.01) |

(52) U.S. Cl.
CPC ............ *H04L 47/125* (2013.01); *H04L 12/66* (2013.01); *H04L 45/22* (2013.01); *H04L 45/28* (2013.01); *H04M 3/367* (2013.01); *H04M 3/42297* (2013.01); *H04W 36/22* (2013.01); *H04W 36/0022* (2013.01)

(58) Field of Classification Search
CPC ....... H04L 47/125; H04L 12/66; H04L 45/28; H04L 45/22; H04W 36/22
See application file for complete search history.

(56) References Cited

U.S. PATENT DOCUMENTS

| | | | | |
|---|---|---|---|---|
| 9,882,805 | B2* | 1/2018 | Thankappan | H04L 45/125 |
| 2004/0196858 | A1* | 10/2004 | Tsai | H04L 51/066 |
| | | | | 370/401 |
| 2010/0220585 | A1* | 9/2010 | Poulson | H04L 45/22 |
| | | | | 370/216 |
| 2010/0234042 | A1* | 9/2010 | Chan | H04W 36/0061 |
| | | | | 455/453 |
| 2010/0260170 | A1* | 10/2010 | Meranchik | H04L 45/3065 |
| | | | | 370/352 |

(Continued)

*Primary Examiner* — Mohammad S Anwar

(57) ABSTRACT

A system comprising a communication activity detecting device, a network selector, and a network control memory structure that operate to detect anomalous communication activity and, in response, send a routing control to a location routing number control memory structure to alter a location routing number, which results in communication activity switching from a first network to a second network. A method including receiving a network switch control to switch communication activity from a first network to a second network, selecting the second network from one or more networks to route the communication activity, and sending a routing control to a location routing number control memory structure. The routing control may include instructions to alter a first location routing number to a second location routing number associated with the second network.

10 Claims, 8 Drawing Sheets

(56) References Cited

U.S. PATENT DOCUMENTS

| | | | |
|---|---|---|---|
| 2013/0129066 A1* | 5/2013 | Yeung | H04M 3/42297 |
| | | | 379/211.01 |
| 2013/0254415 A1* | 9/2013 | Fullen | H04L 67/101 |
| | | | 709/230 |
| 2016/0127539 A1* | 5/2016 | Sharma | H04M 15/08 |
| | | | 379/112.09 |

* cited by examiner

COMMUNICATION FAILOVER AND LOAD BALANCING METHOD

CROSS-REFERENCE TO RELATED APPLICATIONS

This application claims benefit under 35 U.S.C. 119 to U.S. application Ser. No. 62/557,555 filed on Sep. 12, 2017, and incorporated herein by reference in its entirety.

BACKGROUND

Modern communications devices (such as mobile phones, telephones, computer tablets, or the like) have become an integral part of modern life. In order to route calls, these devices access communications networks owned by various operators. The operators of the communications networks can generally be classified as a public telephone operator or a virtual network operator. Public telephone operators own and build landline and wireless communication networks while a virtual network operator typically leases capacity from a public telephone operator.

Only some telecommunications companies have the facilities to access the legacy networks. As a result, this makes market entry difficult for companies without Public Switched Telephone Network (PSTN) facilities. In addition, there are a variety of regulations that restrict direct access to telephone numbers, telecom databases, etc., in particular for non-traditional carriers (e.g., voice over IP (VoIP)), which can be difficult to navigate. Companies that want to enter the market with direct control over their phone numbers have traditionally been required to invest in or lease facilities from public telephone operators for access to the network (e.g., need to lease lines from those who have the physical infrastructure).

Databases and existing hardware with a gateway may be accessed that may route calls on different legacy networks by taking advantage of a new way to use existing IP policy and databases. Some systems utilize numbers in one or more of a carrier's native number block and an algorithm or database to switch a routing number and enter instead a desired phone number/routing location. Using these techniques, calls can be routed to underlying carriers (e.g., facilities carriers) without the need to lease facilities to access the network. For example, in some embodiments, a carrier may map incoming numbers to a different number so that the components of the network believe the call is originating from that carrier even though the call originated from another carrier without dedicated equipment.

BRIEF SUMMARY

A system is disclosed to utilize an IP policy and databases to balance loads on networks and switch networks in case of failure. This may increase the efficiency of the networks, reduce cost associated with operating the networks, and provide increased call reliability. The system determines the properties of available networks, including the network for a current communication activity, and determines whether to remain with the current network for a call, or switch to a new network. The system selects the new network and operates to alter the location routing number of the communication activity to switch to the new network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
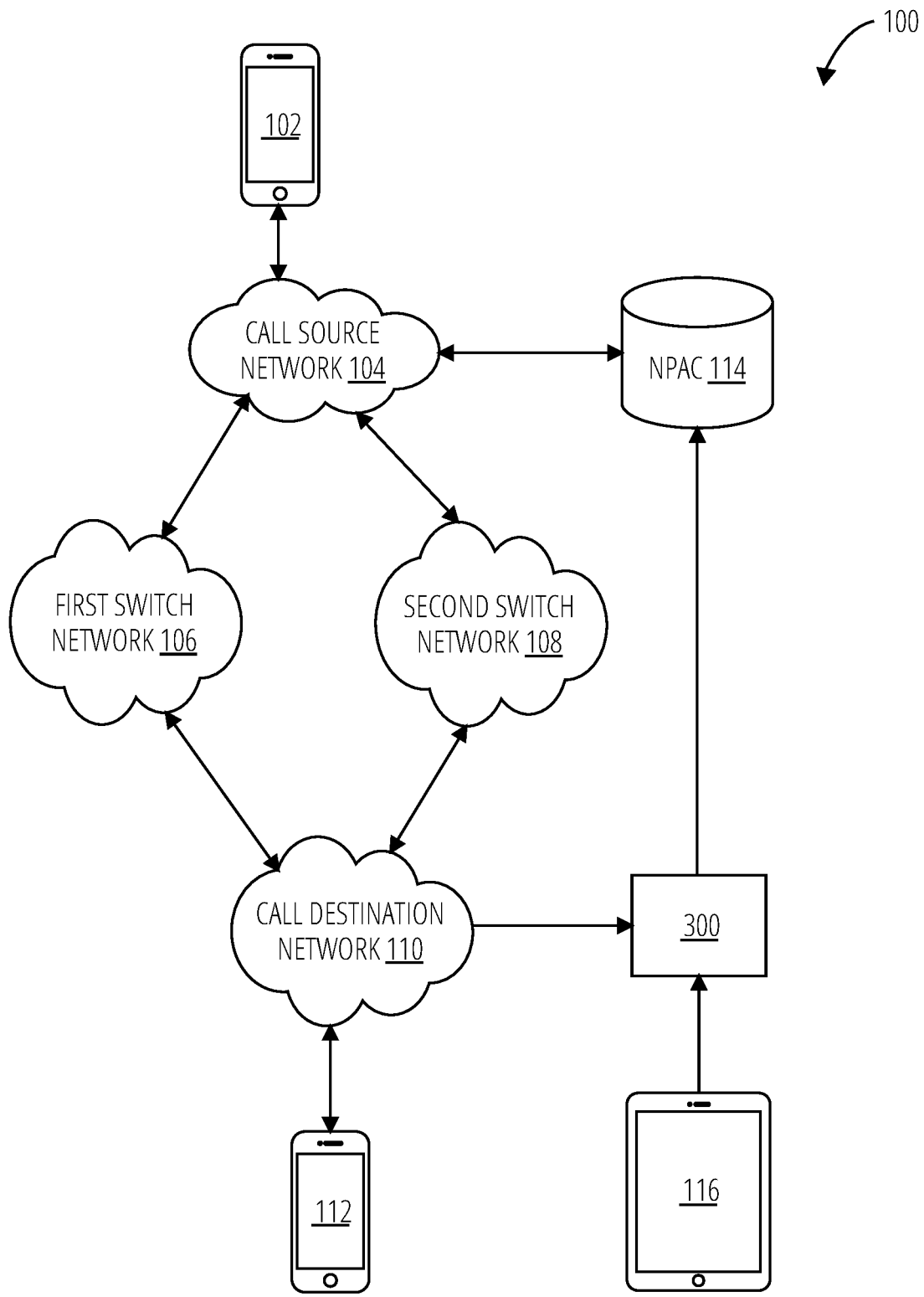
FIG. 1 illustrates an embodiment of a communication network 100.

Referring to FIG. 1, the communication network 100 comprises a source device 102, a call source network 104, a first switch network 106, a second switch network 108, a call destination network 110, a destination device 112, a location routing number control memory structure 114, a user interface 116, and a switch network altering system 300.

The source device 102 sends and receives communication activity to and from the call source network 104. The source device 102 may be a mobile phone, landline telephone, set top box, tablet computer, mobile media device, mobile gam-ing device, wearable computer, vehicle-mounted computer, communications device, telephone switch, softswitch, VoIP device, private branch exchange, endpoints, proxies, network communication components that enable the devices (e.g., mobile, wireline, VoIP, etc.) to communicate with remote servers, switches, gateways, or other network components, etc. The source device 102 provides source and destination information for the communication activity.

The call source network 104 sends and receives communication activity to and from the source device 102. The call source network 104 may send and receive the communication activity to and from the first switch network 106 or the second switch network 108. In some embodiments, multiple switch networks may be utilized. The call source network 104 sends a routing query to the location routing number control memory structure 114. In response, the call source network 104 receives a location routing number from the location routing number control memory structure 114. The location routing number is then utilized by the call source network 104 to determine whether to send the communication activity to the first switch network 106 or the second switch network 108 (or another switch network in embodiments with other switch networks). The call source network 104 may also comprise multiple networks, even multiple heterogeneous networks, such as one or more border networks, voice networks, broadband networks, service provider networks, Internet Service Provider (ISP) net-works, and/or PSTNs, interconnected via gateways operable to facilitate communications between and among the various networks.

The first switch network 106 sends and receives communication activity to and from the call source network 104 and the call destination network 110. The first switch network 106 may be associated with one or more location routing numbers. The first switch network 106 may comprise multiple networks, even multiple heterogeneous networks, such as one or more border networks, voice networks, broadband networks, ser-vice provider networks, Internet Service Provider (ISP) net-works, and/or PSTNs, interconnected via gateways operable to facilitate communications between and among the various networks.

The second switch network 108 sends and receives communication activity to and from the call source network 104 and the call destination network 110. The second switch network 108 may be associated with one or more location routing numbers. The second switch network 108 may comprise multiple networks, even multiple heterogeneous networks, such as one or more border networks, voice networks, broadband networks, ser-vice provider networks, Internet Service Provider (ISP) networks, and/or PSTNs, interconnected via gateways operable to facilitate communications between and among the various networks.

The call destination network 110 sends and receives communication activity to and from the first switch network 106 and the second switch network 108. The call destination network 110 also sends and receives communication activity to and from the destination device 112. The call destination network 110 may send information regarding the communication activity, such as a communication activity indication, to the switch network altering system 300. The call destination network 110 may comprise multiple networks, even multiple heterogeneous networks, such as one or more border networks, voice networks, broadband networks, service provider networks, Internet Service Provider (ISP) networks, and/or PSTNs, interconnected via gateways operable to facilitate communications between and among the various networks.

The destination device 112 sends and receives the communication activity from the call destination network 110. The destination device 112 may be a mobile phone, landline telephone, set top box, tablet computer, mobile media device, mobile gaming device, wearable computer, vehicle-mounted computer, communications device, telephone switch, soft-switch, VoIP device, private branch exchange, endpoints, proxies, network communication components that enable the devices (e.g., mobile, wireline, VoIP, etc.) to communicate with remote servers, switches, gateways, or other network components, etc.

The location routing number control memory structure 114 stores one or more location routing numbers. The one or more location routing numbers may provide information for a call source network 104 to send communication activity to a destination device 112 via a specific switch network (e.g., the first switch network 106 or the second switch network 108) and the call destination network 110. Each of the one or more location routing numbers may be altered in response to a routing control. In some embodiments, the location routing number control memory structure 114 is the Number Portability Administration Center (NPAC) database.

The user interface 116 may receive an input, such as a haptic input, audio input, motion-recognized input, visual-based input, etc. In response to the input, the user interface 116 may send a network switch control to the switch network altering system 300. The input may be received from a user or from another component, including those diagnosing an unknown network issue, wherein altering the location routing number enables the user or component to determine the network, or network parts, causing the issue.

The switch network altering system 300 receives information regarding the communication activity, such as a communication activity indication, from the call destination network 110 and, if the communication activity indication is determined to be a network switch control, may send a routing control to the location routing number control memory structure 114. The switch network altering system 300 may also receive a network switch control from the user interface 116 and send a routing control in response. The routing control alters the location routing number control memory structure 114 to associate a different location routing number with the destination device 112. The switch network altering system 300 is further depicted in FIG. 3. The communication network 100 may be operated in accordance the process depicted in FIG. 4, FIG. 5, and FIG. 6.

Figure 2:
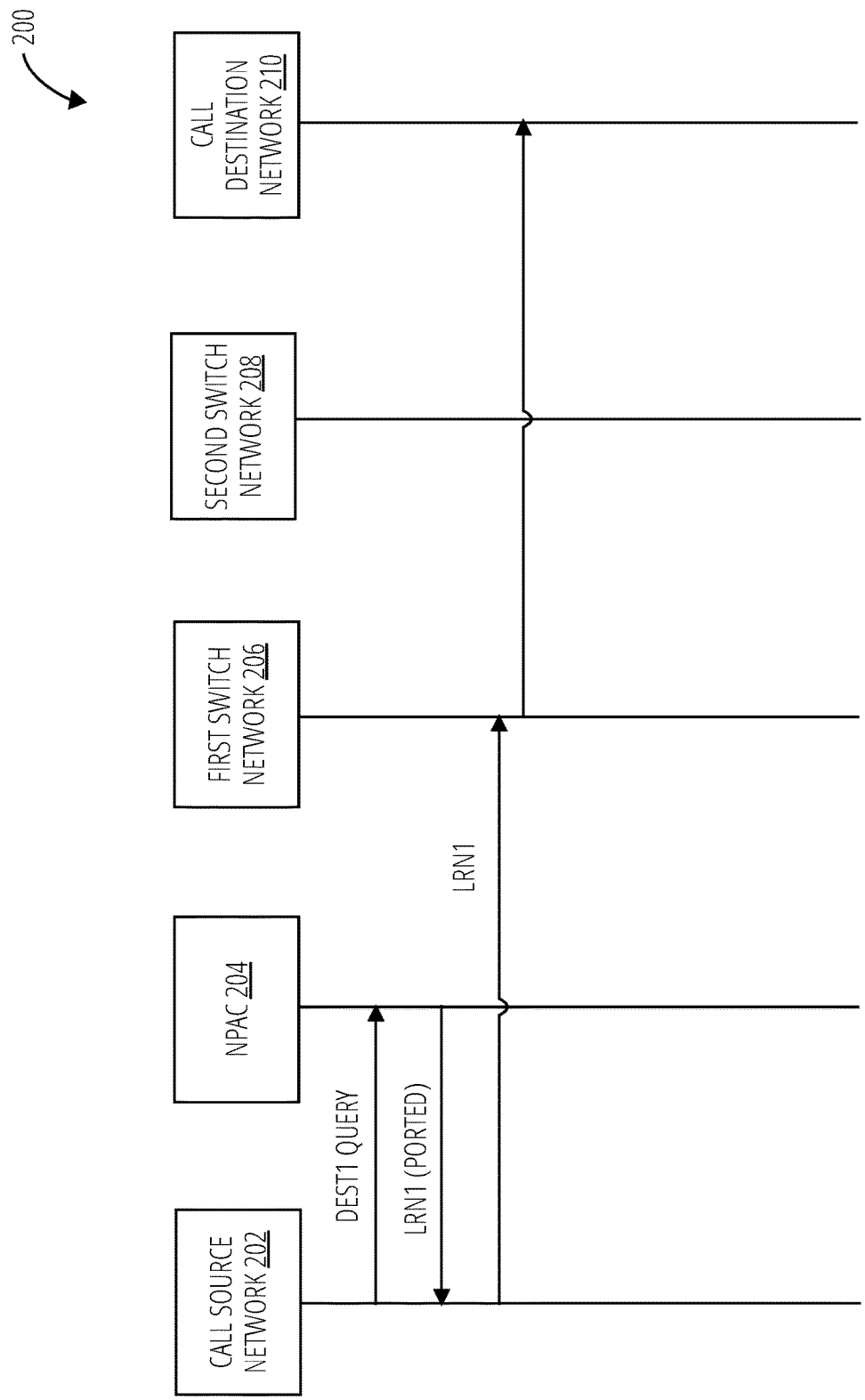
FIG. 2 illustrates an embodiment of a call routing diagram 200.

Referring to FIG. 2, in a call routing diagram 200 according to the prior art, the call source network 202 sends a destination query to the location routing number control memory structure 204. In response, the location routing number control memory structure 204 sends the first location routing number for the first switch network 206. The call source network 202 then utilizes the first location routing number to send communication activity to the first switch network 206, and then to the call destination network 210.

Figure 3:
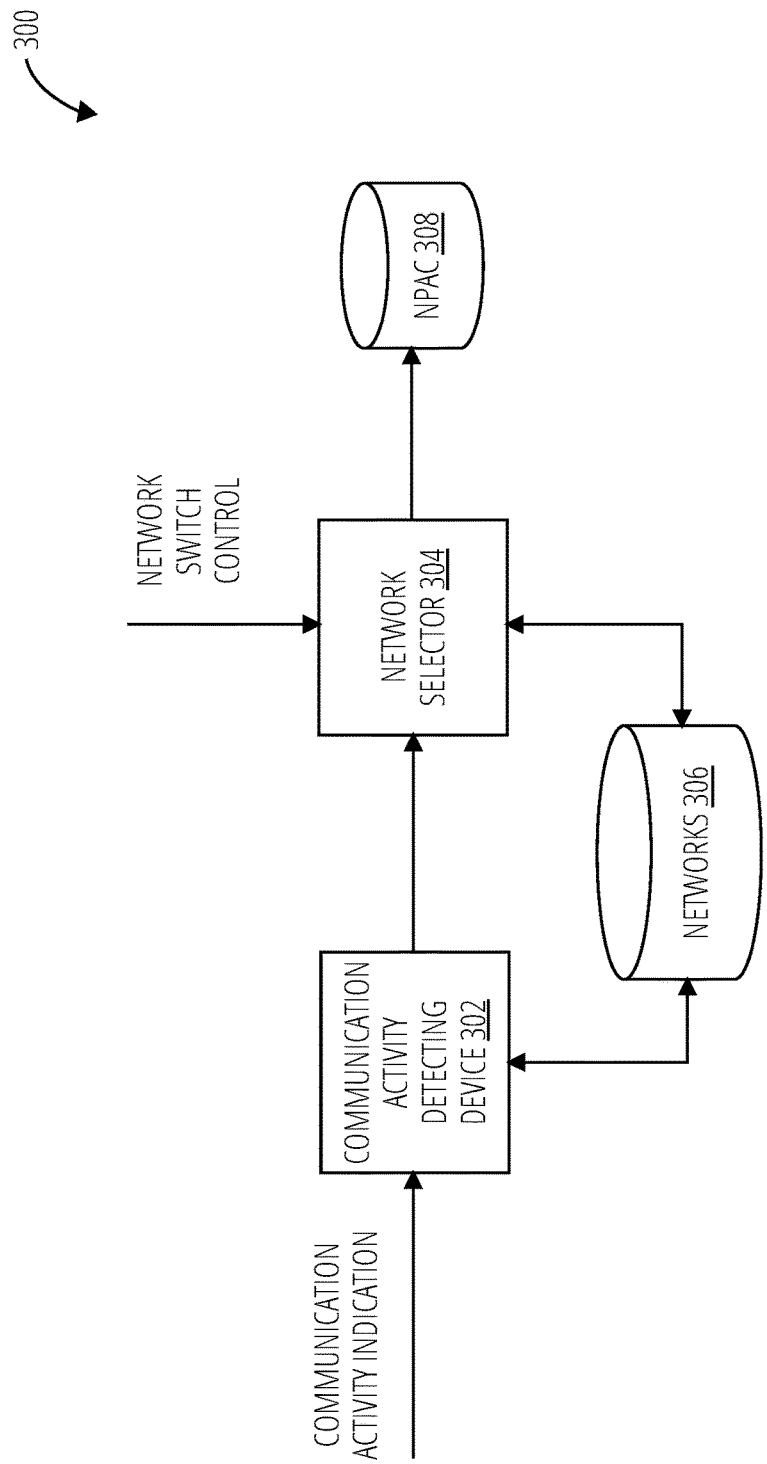
FIG. 3 illustrates an embodiment of a switch network altering system 300.

Referring to FIG. 3, the switch network altering system 300 comprises a communication activity detecting device 302, a network selector 304, a network control memory structure 306, and a location routing number control memory structure 308.

The communication activity detecting device 302 receives the communication activity or information regarding the communication activity, such as a communication activity indication. The communication activity or the communication activity indication may be received from a call destination network, switch network, or call source network. The communication activity indication may result from a probing signal utilizing the same network as the communication activity. The probing signal may be utilized to reduce the resources needed to be transformed into the communication activity indication. The communication activity detecting device 302 determines whether the communication activity indication is a network switch control and, thus, alter the location routing number of the communication activity. The communication activity detecting device 302 may utilize the discontinuation of the communication activity, the transmission quality, the communication latency across a network, the total activity on a network relative to other networks, etc. to determine whether to send a control to the network selector 304 to select another network. The communication activity detecting device 302 may send a query to the network control memory structure 306 to receive information to compare to the communication activity or the communication activity indication. The information may include pre-determined or dynamically-determined thresholds based on the activities of other networks to which to compare the communication activity. The communication activity detecting device 302 may also compare the current load balance of the network carrying the communication activity to other networks. The communication activity detecting device 302 sends a control signal to the network selector 304 to select a new switch network and send a routing control to the location routing number control memory structure 308.

The network selector 304 receives a control signal from the communication activity detecting device 302. The control signal operates the network selector 304 to select a new network (e.g., switch network) to be utilized to transmit the communication activity. The network selector 304 may also receive a network switch control directly, which operates the network selector 304 to select a new network. The network switch control may comprise information regarding the networks to be switched. The network selector 304 may send a query to the network control memory structure 306 to send information regarding which networks are available for the communication activity, as well as information regarding operational capabilities and current operations of those network. The network selector 304 may, for example, select the new network based on the network with lowest current activity, the greatest additional capacity, the current and historical latency of the network, the probability of cessation of communication activity, etc. or a combination of these network properties. The network selector 304 then sends the routing control to the location routing number control memory structure 308, the routing control comprising instructions to alter the location routing number in the location routing number control memory structure 308 to a location routing number associated with the network selected by the network selector 304.

The network control memory structure 306 stores information regarding one or more networks. The information may include pre-determined or dynamically-determined thresholds based on the activities of other networks, current load balance of the one or more networks, which of the one or more networks are available for the communication activity, operational capabilities of each of the one or more networks, current activity, additional capacity, current and historical latency, the probability of cessation of communication activity, etc. The information may be stored as communication activity controls. The network control memory structure 306 sends the communication activity controls to the communication activity detecting device 302 or the network selector 304 in response to a query.

The location routing number control memory structure 308 receives the routing control from the network selector 304 and, in response, alters the location routing number associated with the communication activity to a location routing number associated with the network selected by the network selector 304.

In some embodiments, the switch network altering system 300 may further comprise a communication activity indication conversion device. The communication activity indication conversion device may receive the communication activity, transform the communication activity into the communication activity indication, and send the communication activity indication to the communication activity detecting device. The communication activity indication conversion device may extract the communication speed, the first latency of the network, current activity of the network, etc. The switch network altering system 300 may be operated in accordance the process depicted in FIG. 4, FIG. 5, and FIG. 6.

Figure 4:
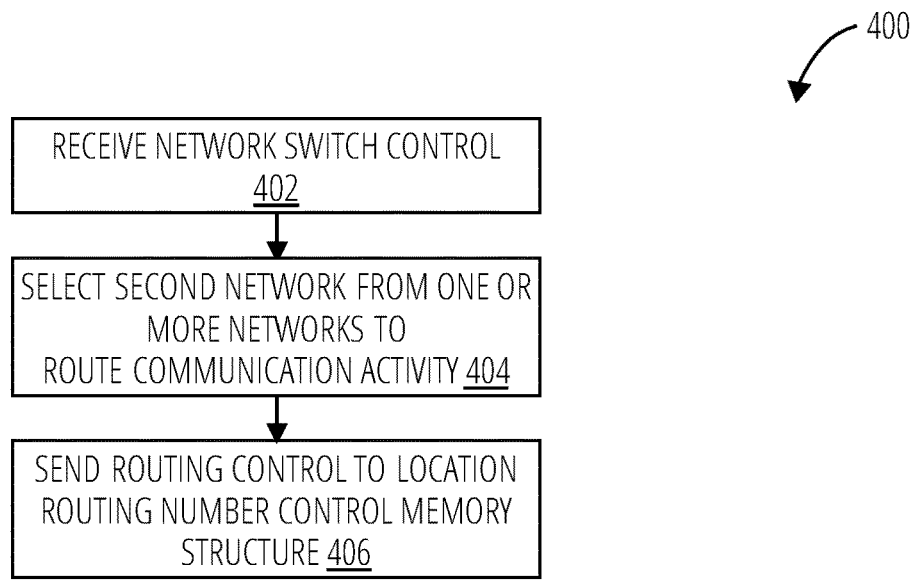
FIG. 4 illustrates an embodiment of a location routing number altering method 400.

Referring to FIG. 4, the location routing number altering method 400 receives a network switch control (block 402). A second network is selected from one or more networks to route the communication activity (block 404). The network switch control may comprise information regarding the second network. For example, the network switch control may comprise weights for selecting the second network or may provide the second network. The network switch control may be received in response to an input to a user interface or as a communication activity indication of communication activity. A routing control is sent to a location routing number control memory structure (block 406). The routing control comprises instructions to alter the first location routing number to a second location routing number. The second location routing number is associated with the second network.

The second location routing number may be selected from one or more location routing numbers, each of the one or more location routing numbers associated with the second network. The one or more routing numbers may be associated with the Telcordia LERG Routing Guide.

Figure 5:
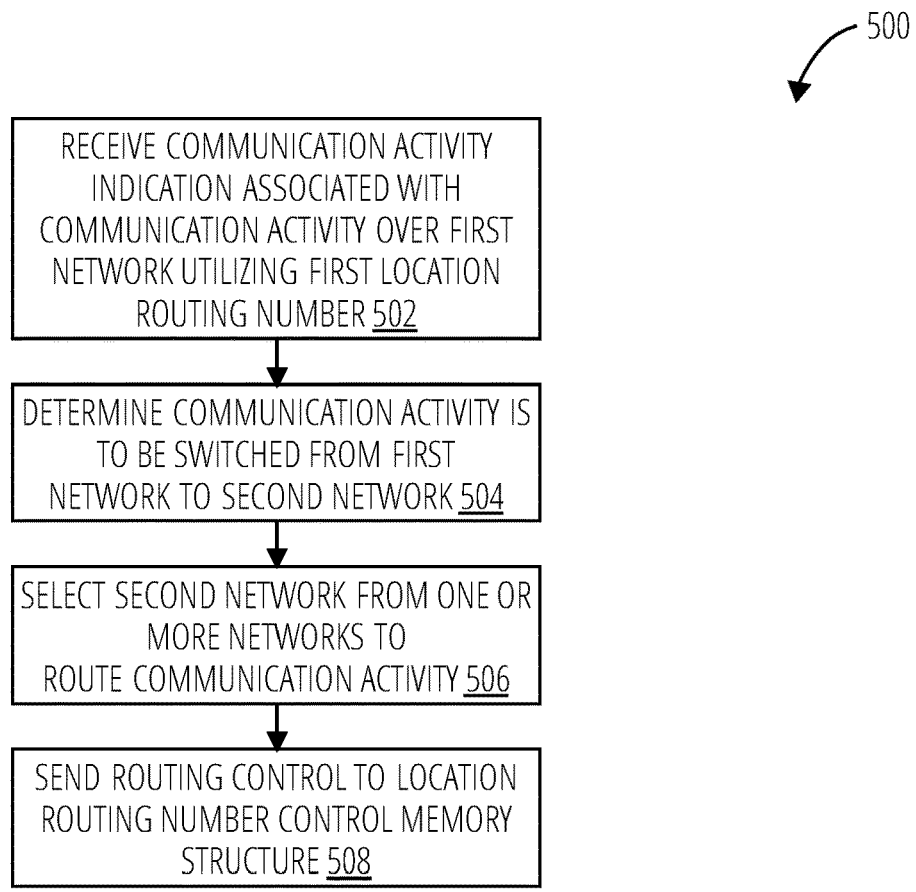
FIG. 5 illustrates an embodiment of a location routing number altering method 500.

Referring to FIG. 5, the location routing number altering method 500 receives a communication activity indication associated with communication activity over a first network utilizing a first location routing number (block 502). Whether the communication activity is to be switched from the first network to a second network is determined (block 504). If so, a second network is selected from one or more networks to route the communication activity (block 506). A routing control is sent to a location routing number control memory structure (block 508). The routing control comprises instructions to alter the first location routing number to a second location routing number. The second location routing number is associated with the second network.

In some embodiments, the communication activity may be switched from the first network to the second network in response to not receiving the communication activity from the first network. The communication activity may be switched from the first network to the second network in response to the communication activity having a communication speed below a communication threshold. The communication activity may be switched from the first network to the second network in response to the first network having a first latency above a latency threshold and the second network is selected in response to having a second latency lower than the latency threshold.

The second location routing number may be selected from one or more location routing numbers, each of the one or more location routing numbers associated with the second network. The one or more routing numbers may be associated with the Telcordia LERG Routing Guide.

Figure 6:
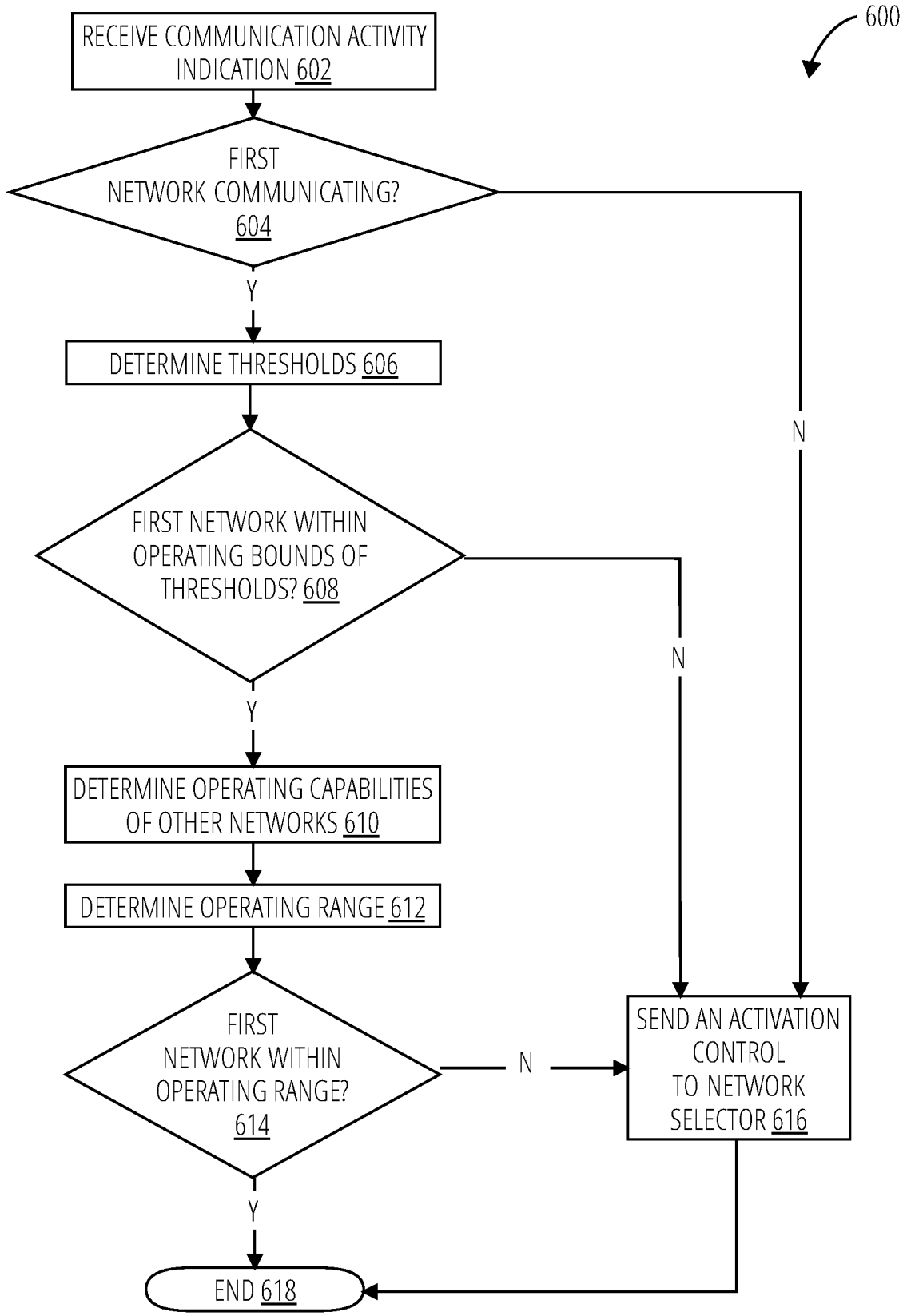
FIG. 6 illustrates an embodiment of a network switching initiation method 600.

Referring to FIG. 6, the network switching initiation method 600 receives a communication activity indication (block 602). The network switching initiation method 600 determines whether the first network is communicating (decision block 604). The determination is based on the communication activity indication. If the first network is communicating, thresholds are determined (block 606). The thresholds may be queried from a network control memory structure comprising communication activity controls. The thresholds may include latency threshold and a communication threshold, which may indicate speed of the network. The network switching initiation method 600 determine whether the first network is operating within the bounds of the thresholds (decision block 608). The communication activity indication may be compared to the thresholds. Multiple thresholds may be utilized. If the first network is operating within the bounds of the thresholds, the operating capabilities of other networks are determined (block 610). The operating capabilities may be queried from a network control memory structure. An operating range is then determined for the first network from the operating capabilities of the other networks (block 612). The network switching initiation method 600 then determines if the first network is within the operating range determined (decision block 614). If so, the network switching initiation method 600 ends (done block 618).

If the first network is not communicating, not operating within the bounds of the thresholds, or the operating range determined, an activation control is sent to a network selector (block 616). The network switching initiation method 600 then ends (done block 618).

Figure 7:
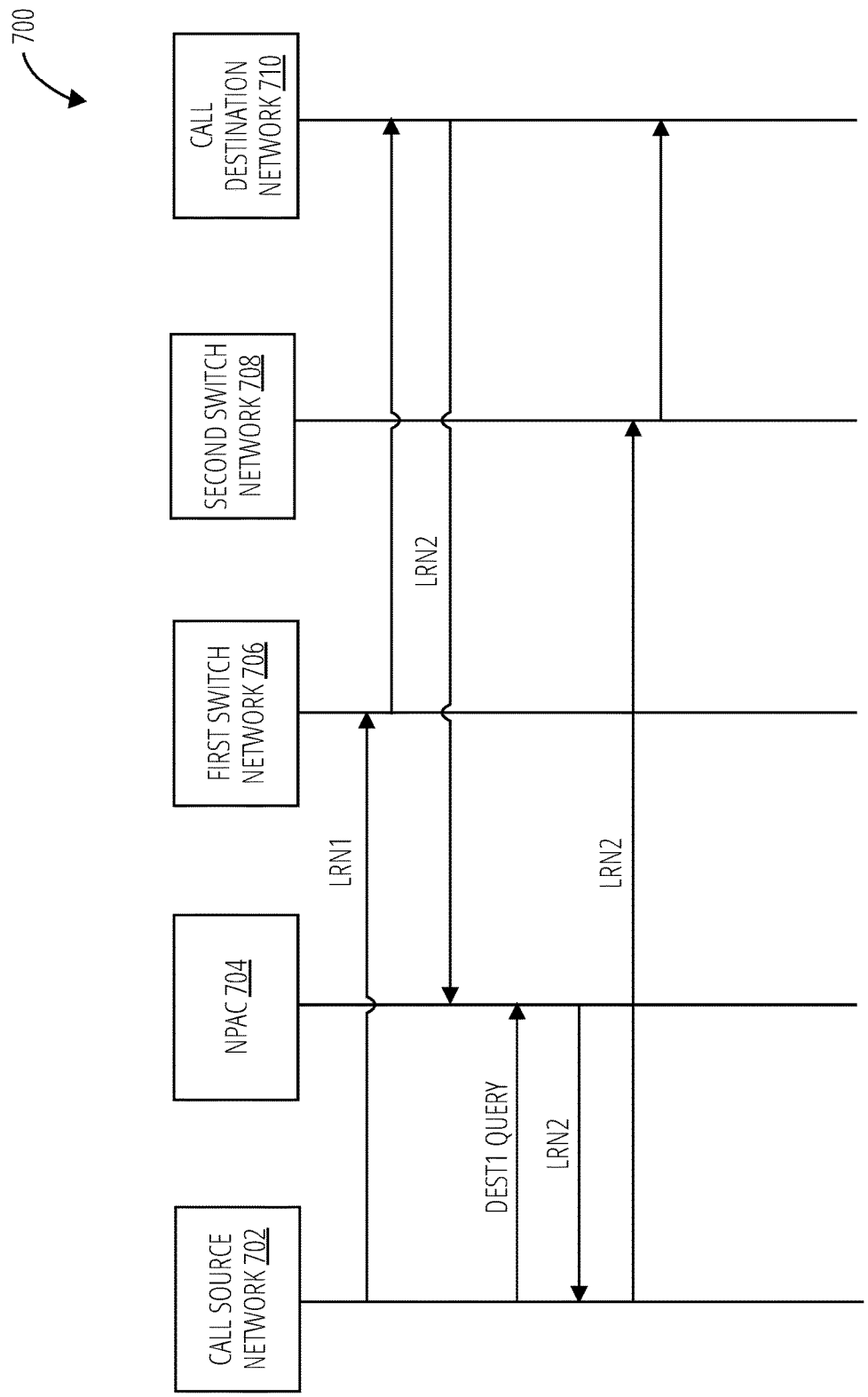
FIG. 7 illustrates an embodiment of a call routing diagram 700.

Referring to FIG. 7, the call source network 702 is utilizing the first location routing number to send communication activity to the call destination network 710 via the first switch network 706.

A routing control is then sent from the call destination network 710 to the location routing number control memory structure 704 to alter the first location routing number to a second location routing number, which is associated with the second switch network 708. The call source network 702 queries the location routing number control memory structure 704 and in response the location routing number control memory structure 704 sends the second location routing number to the call source network 702. The call source network 702 then utilizes the second location routing number to send the communication activity to the call destination network 710 via the second switch network 708.

Figure 8:
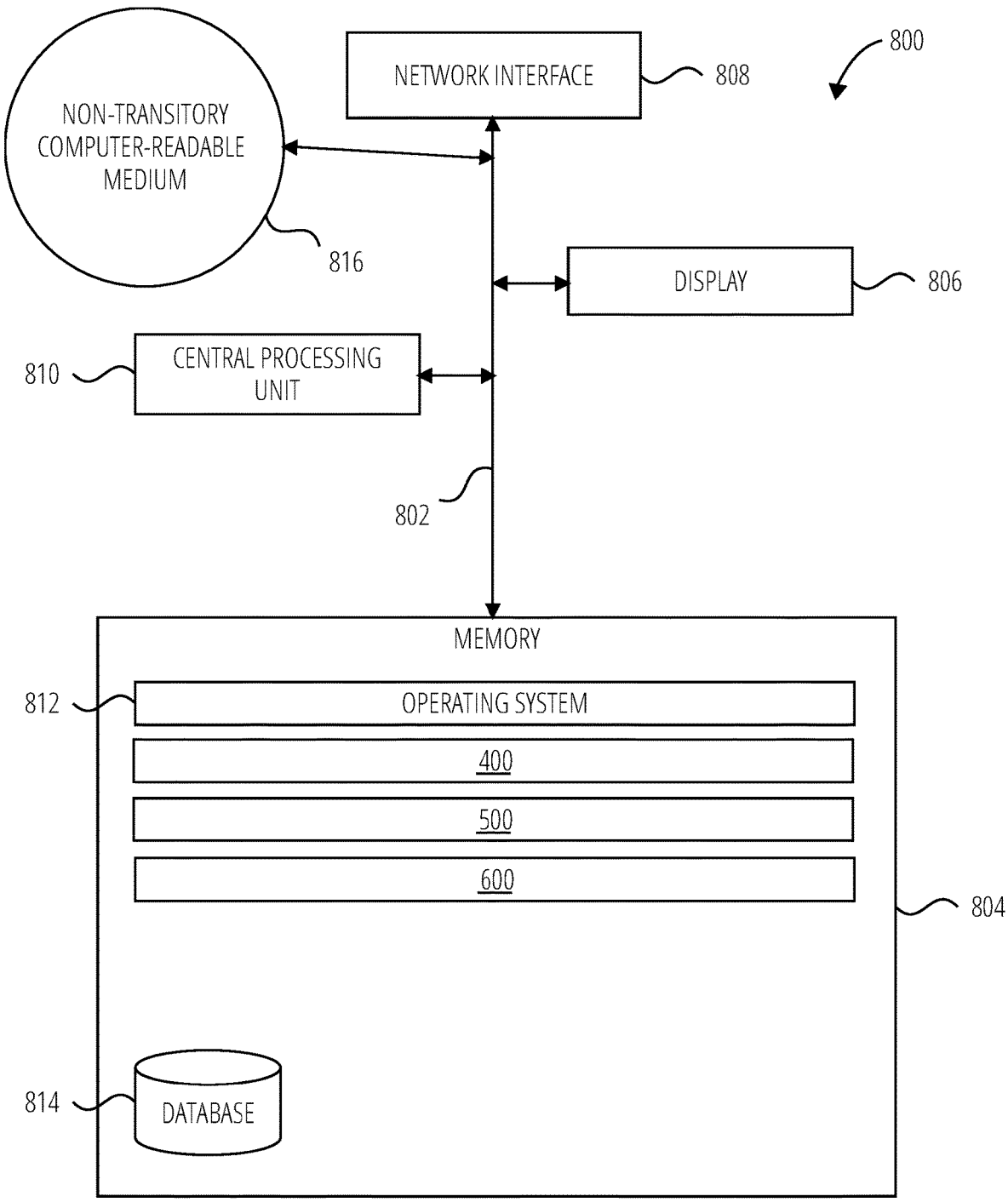
FIG. 8 illustrates a system 800 in accordance with one embodiment.

FIG. 8 illustrates several components of an exemplary system 800 in accordance with one embodiment. In various embodiments, system 800 may include a desktop PC, server, workstation, mobile phone, laptop, tablet, set-top box, appliance, or other computing device that is capable of performing operations such as those described herein. In some embodiments, system 800 may include many more components than those shown in FIG. 8. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 800 may comprise one or more physical and/or logical devices that collectively provide the functionalities described herein. In some embodiments, system 800 may comprise one or more replicated and/or distributed physical or logical devices.

In some embodiments, system 800 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 800 includes a bus 802 interconnecting several components including a network interface 808, a display 806, a central processing unit 810, and a memory 804.

Memory 804 generally comprises a random access memory ("RAM") and permanent non-transitory mass storage device, such as a hard disk drive or solid-state drive. Memory 804 stores an operating system 812.

These and other software components may be loaded into memory 804 of system 800 using a drive mechanism (not shown) associated with a non-transitory computer-readable medium 816, such as a DVD/CD-ROM drive, memory card, network download, or the like.

Memory 804 also includes database 814. In some embodiments, system 800 may communicate with database 814 via network interface 808, a storage area network ("SAN"), a high-speed serial bus, and/or via the other suitable communication technology.

In some embodiments, database 814 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"Activation control" in this context refers to an electronic signal utilized to operate a device.

"Associator" in this context refers to a correlator (see the definition for Correlator).

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Communication activity" in this context refers to communication signals over a communication network associated with a source device and a destination device, as determined by an input to the source device.

"Communication activity indication" in this context refers to the properties of a specific communication activity, such as whether the communication was received by the source network, switch network destination network, or destination device; speed of the communication through the networks; latency of the networks carrying the communication; communication quality; etc.

"Communication speed" in this context refers to total maximum transfer rate of a network cable or device.

"Communication threshold" in this context refers to a value corresponding to the total maximum transfer rate of a network cable or device, which may be utilize to compare to the maximum transfer rate.

"Comparator" in this context refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1>input2) output=val2; else output=val3; Many other examples of comparators will be evident to those of skill in the art, without undo experimentation.

"Correlator" in this context refers to a logic element that identifies a configured association between its inputs. One examples of a correlator is a lookup table (LUT) configured in software or firmware. Correlators may be implemented as relational databases. An example LUT correlator is: |low_alarm_condition |low_threshold_value 0| |safe_condition |safe_lower_bound |safe_upper_bound| |high_alarm_condition|high_threshold_value| 0 |Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Latency" in this context refers to the delay before a transfer of data begins following an instruction for its transfer.

"Latency threshold" in this context refers to a value corresponding to the delay before a transfer of data begins following an instruction for its transfer, which may be utilize to compare to the delay.

"Location routing number" in this context refers to a unique number that uses the format of a telephone number, but actually represents an entire telephone switch through which multiple telephone numbers are routed.

"Network" in this context refers to a collection of terminal nodes, links are connected so as to enable telecommunication between the terminals. The transmission links connect the nodes together. The nodes use circuit switching, message switching or packet switching to pass the signal through the correct links and nodes to reach the correct destination terminal.

"Selector" in this context refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection1==true and selection232 =true) output=input1; else if (selection1==true and selection232 =false) output= input2; else if (selection1==false and selection2==true) output=input3; else output=noOp; Switches operate similarly to selectors in many ways (see the definition of Selector), except in some cases switches may select all inputs to the output,(s) not select among inputs. Other examples of switches will be readily apparent to those having skill in the art, without undo experimentation.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof.

What is claimed is:

1. A system to set up a communication call, the system comprising:
   a network selector device to receive a call request for a destination device having a call number, the call number corresponding to a first location routing number associated with a first network stored in a location routing number memory database for the destination device;
   a communication activity detector to:
      send a probing signal that is different than communication activity through the first network,
      create a communication activity indication of the first network based on a result of the probing signal, and
      generate an activation control for the network selector device based on a comparison of the communication activity indication to one or more communication activity controls for the first network, and
   wherein the network selector is configured to:
      select a second network based on the activation control from one or more networks, and
      send a routing control to a location routing number control memory structure, the routing control comprising instructions to alter the first location routing number associated with the first network to a second location routing number stored in a Number Portability Administration Center (NPAC) database in correspondence with the call number of the destination device, the second location routing number to communicate with the destination device based on the call number, the second location routing number associated with the second network.

2. The system of claim 1, wherein the communication activity detector is to:
   receive information indicative of a communication activity based on the call number of the destination device; and
   determine the communication activity indication corresponding to the communication activity information.

3. The system of claim 2, wherein the one or more communication activity controls is based on at least one of a communication speed of the second network, a first latency of the second network, current activity of the second network.

4. The system of claim 1, wherein the one or more communication activity controls is based on at least one of:
   a pre-determined or dynamically-determined threshold corresponding to an activity of the second network,
   current load balance of the one or more first and second networks,
   an identification of the second network available for the communication activity,
   operational capabilities of the second network,
   a current activity of the second network,
   additional capacity of the second network,
   current and historical latency of the second network, and
   a probability of cessation of communication activity.

5. A system for controlling communications, comprising:
   a first input to receive a control signal; and
   a controller configured to:
      send a probing signal that is different than communication activity through a first network;
      obtain information regarding a communication activity of the first network based on a result of the probing signal; and
      change routing networks between a source device and a destination device based on information regarding a comparison of the communication activity of the first network to communication activity in a second network contained provided by the control signal, wherein the controller includes a selector to change first location routing information of a first routing network stored in a location routing number memory database to second location routing information of a second routing network stored in the location routing number memory database for routing a communication to the destination device based on identification information for the destination device, wherein each of the first location routing information and the second location routing information is stored in the location routing number memory database in correspondence with identification information for the destination device.

6. The system of claim 5, wherein the control signal includes network switch control information from a user interface, the network switch control information indicating that the selector is to change the first location routing information to the second location routing information for the destination device.

7. The system of claim 5, wherein the controller is to:
compare the communication activity indication information to one or more predetermined thresholds and wherein the selector is to change the first location routing information to the second location routing information based on a result of the comparison.

8. The system of claim 5, wherein the information includes at least one of:
information regarding a communication speed,
information regarding latency,
information regarding activity of the first location routing network, and
information regarding activity of the second location routing network.

9. The system of claim 5, wherein the identification information includes a phone number of the destination device.

10. The system of claim 5, wherein the identification information includes a network address of the destination device.

* * * * *